US011095445B2

(12) United States Patent
Gupta et al.

(10) Patent No.: US 11,095,445 B2
(45) Date of Patent: Aug. 17, 2021

(54) KEY MANAGEMENT AND RECOVERY

(71) Applicant: Dell Products L.P., Round Rock, TX (US)

(72) Inventors: Chitrak Gupta, Bangalore (IN); Rama Rao Bisa, Bangalore (IN); Sushma Basavarajaiah, Bangalore (IN); Kala Sampathkumar, Bangalore (IN); Shekar Babu Suryanarayana, Bangalore (IN); Mukund P. Khatri, Austin, TX (US); Ajay Shenoy, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 233 days.

(21) Appl. No.: 16/262,302

(22) Filed: Jan. 30, 2019

(65) Prior Publication Data
US 2020/0244454 A1 Jul. 30, 2020

(51) Int. Cl.
*H04L 29/06* (2006.01)
*H04L 9/08* (2006.01)

(52) U.S. Cl.
CPC ................................. *H04L 9/0894* (2013.01)

(58) Field of Classification Search
CPC .................................................... H04L 9/0894
See application file for complete search history.

(56) References Cited

U.S. PATENT DOCUMENTS

| 7,376,968 | B2 | 5/2008 | Ritz et al. | |
| 7,475,238 | B1 * | 1/2009 | Yakovlev | G06F 9/4411 |
| | | | | 713/1 |
| 2007/0143606 | A1 | 6/2007 | Bandholz et al. | |
| 2017/0243021 | A1 * | 8/2017 | Gupta | G06F 21/606 |
| 2017/0249794 | A1 * | 8/2017 | Davis | G07C 9/00857 |
| 2019/0370011 | A1 * | 12/2019 | Liu | G06F 9/4411 |

* cited by examiner

*Primary Examiner* — Anthony D Brown
*Assistant Examiner* — Rodman Alexander Mahmoudi
(74) *Attorney, Agent, or Firm* — Haynes and Boone, LLP

(57) ABSTRACT

A system includes a management system, a managed system that is coupled to the management system through a network. The managed system comprises a managed device, a key identifier storage, a first managed device locking system coupled to the managed device and the key identifier storage, and a second managed device locking system coupled to the managed device, the key identifier storage, and the first managed device locking system. The first managed device locking system is configured to store a key identifier of the managed device in the key identifier storage and to provide access to a locking key of the managed device based upon the key identifier of the managed device, stored in a management system. The second managed device locking system is configured to monitor the managed device for an event that triggers unlocking the managed device, monitor operating status of the first managed device locking system. In some embodiments, where the first managed device locking system is unavailable, the second managed device locking system is configured to provide access to the locking key of the managed device based upon the key identifier of the managed device, stored in the management system.

20 Claims, 6 Drawing Sheets

KEY MANAGEMENT AND RECOVERY

BACKGROUND

The present disclosure relates to generally to information handling systems, and more particularly to a method and system for key management and recovery in an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many information handling systems such as, for example, server systems, and/or other computing devices known in the art, typically include enhanced security by locking managed devices within the server system with device locking keys. For example, for many server systems in datacenters, network-based key management systems have been developed to provide for the centralized management of device locking keys used to lock managed devices in the server systems, with the server systems configured to retrieve those device locking keys via in-band methods (e.g., using operating system services provided via an application or agent running in the operating system on the server system) or out-of-band methods (e.g., via a remote access controller that operates independently of the operating system and uses a dedicated network connection to the key management system that is separate from that used by the operating system.) However, the use of such network-based key management systems can raise issues, for example, when the remote access controller becomes unavailable or un-operational, device locking key(s) may not be accessed via out-of-band methods.

Information handling systems such as, for example server systems, are typically managed in order to update firmware, restore platforms, retrieve server event/error logs, retrieve or update boot configuration data, and/or provide for a variety of other server management activities known in the art. In conventional systems, server systems include a remote access controller (e.g., a Dell Remote Access Controller (DRAC) or integrated DRAC (iDRAC) available from DELL® Inc. of Round Rock, Tex., United States) that performs much of the management for the server systems, and management data (e.g., firmware image data, platform restore data, server event/error logs, boot configuration data, access/read storage devices, etc.) is used for performing out-of-band server management activities, although other remote access controllers will fall within the scope of the present disclosure as well. In some situations, Operating System (OS) applications may require in-band communication link to perform much of the management for the server systems and management data described above. For example, managed device(s) such as bootable storage device(s) or drive(s) utilized in the booting of the server systems may often be locked via the device locking key(s) (e.g., storage device locking keys) discussed above. However, because those storage device locking key(s) are/is stored on the key management system, the booting, startup, resetting, and/or other initialization operations performed by the server system cannot be performed due to the remote access controller unavailability to retrieve the storage device locking key(s) that are/is required to unlock of the storage device(s) needed to initialize the server system. Such issues are exacerbated when the remote access controller becomes unavailable, as the server systems will not be able to retrieve their/its storage device locking key(s) at all, preventing those server systems from initializing until the remote access controller is once again available. As such, conventional key management systems and methods lack providing a secure in-band access to device locking key(s) and are unable to operate as described above where a remote access controller device in a server system becomes unavailable/un-operational.

Accordingly, it would be desirable to provide an improved key management system.

SUMMARY

According to one embodiment, an Information Handling System (IHS) includes a managed device, a key identifier storage, a first managed device locking system coupled to the managed device and the key identifier storage, and a second managed device locking system coupled to the managed device, the key identifier storage, and the first managed device locking system. The first managed device locking system is configured to store a key identifier of the managed device in the key identifier storage and to provide access to a locking key of the managed device based upon the key identifier of the managed device, stored in a management system. The second managed device locking system is configured to monitor the managed device for an event that triggers unlocking the managed device, monitor operating status of the first managed device locking system. In some embodiments, where the first managed device locking system is unavailable, the second managed device locking system is configured to provide access to the locking key of the managed device based upon the key identifier of the managed device, stored in the management system.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
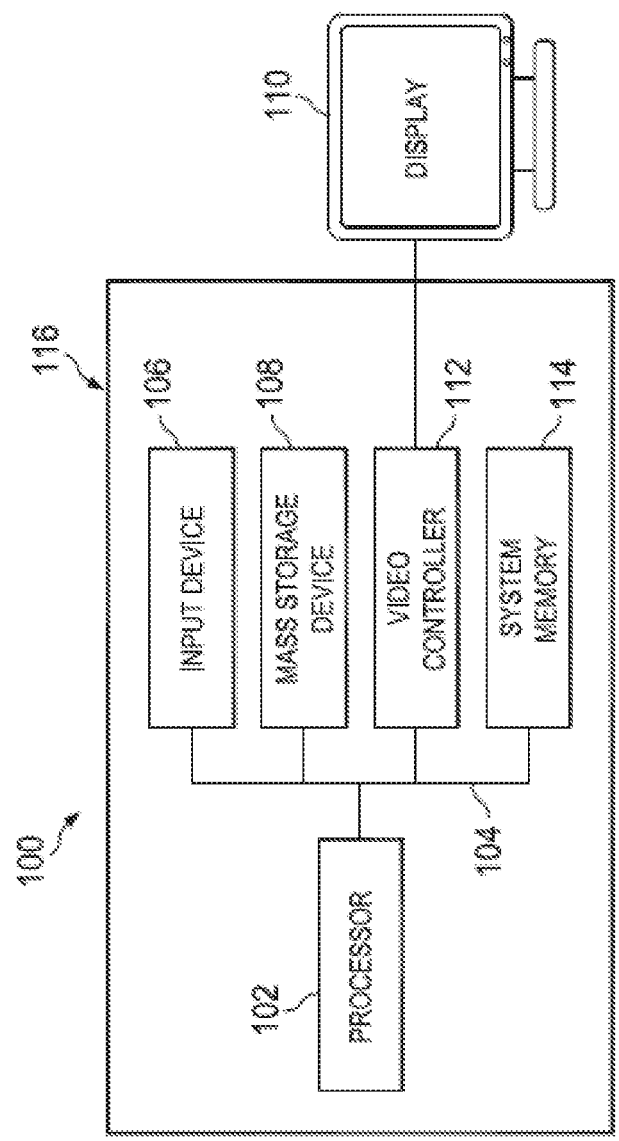
FIG. 1 is a schematic view illustrating an information handling system according to some embodiments.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
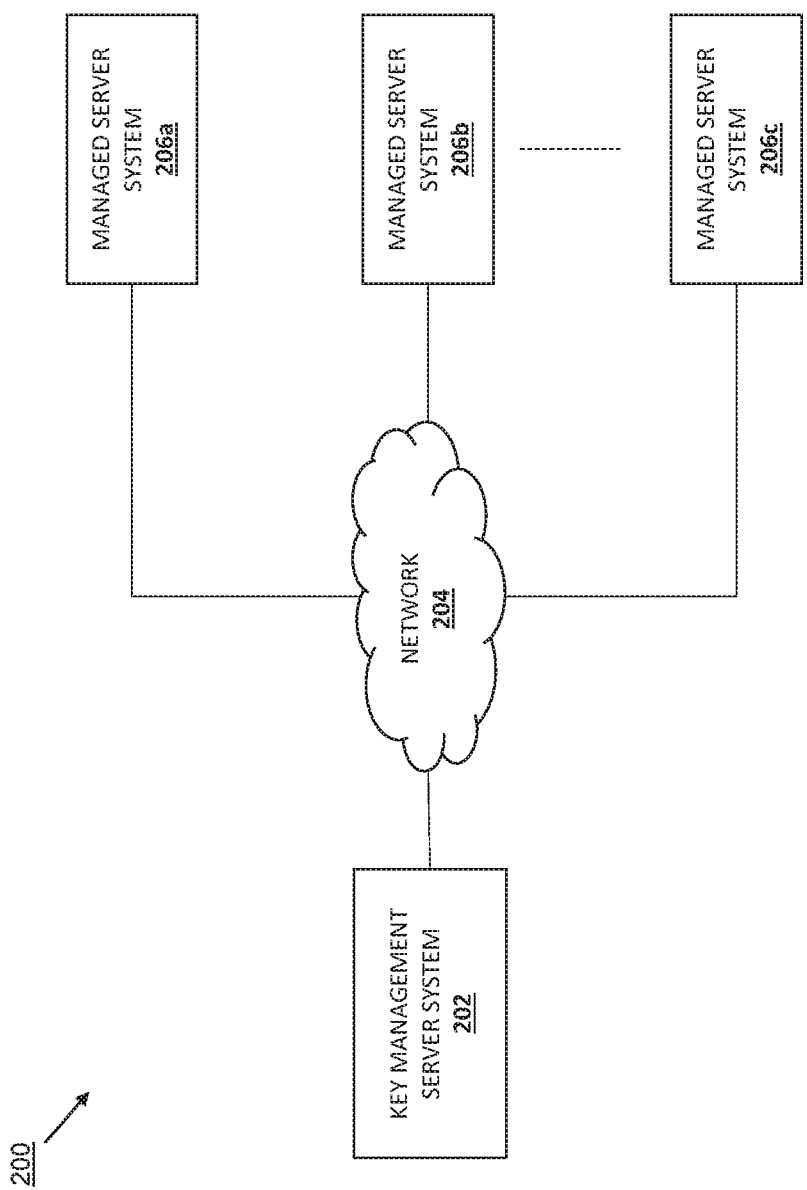
FIG. 2 is a schematic view illustrating a key management system according to some embodiments.

Referring now to FIG. 2, a key management system 200 is illustrated according to some embodiments. As discussed herein, the key management system 200 includes a management system that may be provided by one or more of the IHSs 100 discussed above with reference to FIG. 1, and/or that may include any or all of the components of the IHS 100. In the illustrated embodiment, the key management system 200 is provided by or implemented with a key management server system 202 that may include one or more server devices, although other computing devices may be utilized to provide the management system while remaining within the scope of the present disclosure as well. In a specific example, the key management server system 202 includes one or more server devices that are configured according to the Key Management Interoperability Protocol (KMIP), which one of skill in the art in possession of the present disclosure will recognize is an extensible communication protocol that defines message formats for the manipulation of cryptographic keys via server device(s) providing the key management server system 202, which facilitates data encryption by simplifying encryption key management. As such, keys may be created on a server and then retrieved, possibly wrapped by other keys, with both symmetric and asymmetric keys supported, and including the ability to sign certificates. One of skill in the art in possession of the present disclosure will recognize that the KMIP also allows for clients to ask a server to encrypt or decrypt data, without needing direct access to the key. However, while a specific protocol is discussed herein as being utilized by the key management system 200, one of skill in the art in possession of the present disclosure will recognize that keys may be managed according to the teachings of the present disclosure via a variety of key management protocols while remaining within the scope of the present disclosure as well.

In the illustrated embodiment, the key management server system 202 is coupled to the network 204 that may be provided by a Local Area Network (LAN), the Internet, and/or any other network that would be apparent to one of skill in the art in possession of the present disclosure. Furthermore, a plurality of managed systems may be coupled to the management system of the present disclosure via the network 204. In an embodiment, any or all of the managed systems may be provided by the IHS 100 discussed above with reference to FIG. 1, and/or may include any or all of the components of the IHS 100. For example, in the illustrated embodiment, the managed systems are provided by or implemented with managed server systems 206a, 206b, and up to 206c, each of which is coupled through the network 204 to the key management server system 202. While one of skill in the art in possession of the present disclosure will recognize that the embodiment discussed herein describe a datacenter including a datacenter network that couples together the key management server system and the managed server systems, any of a variety of managed systems may be coupled to a management system via a network while operating according to the teachings of the present disclosure, and those embodiments are envisioned as falling within the scope of the present disclosure as well.

Figure 3:
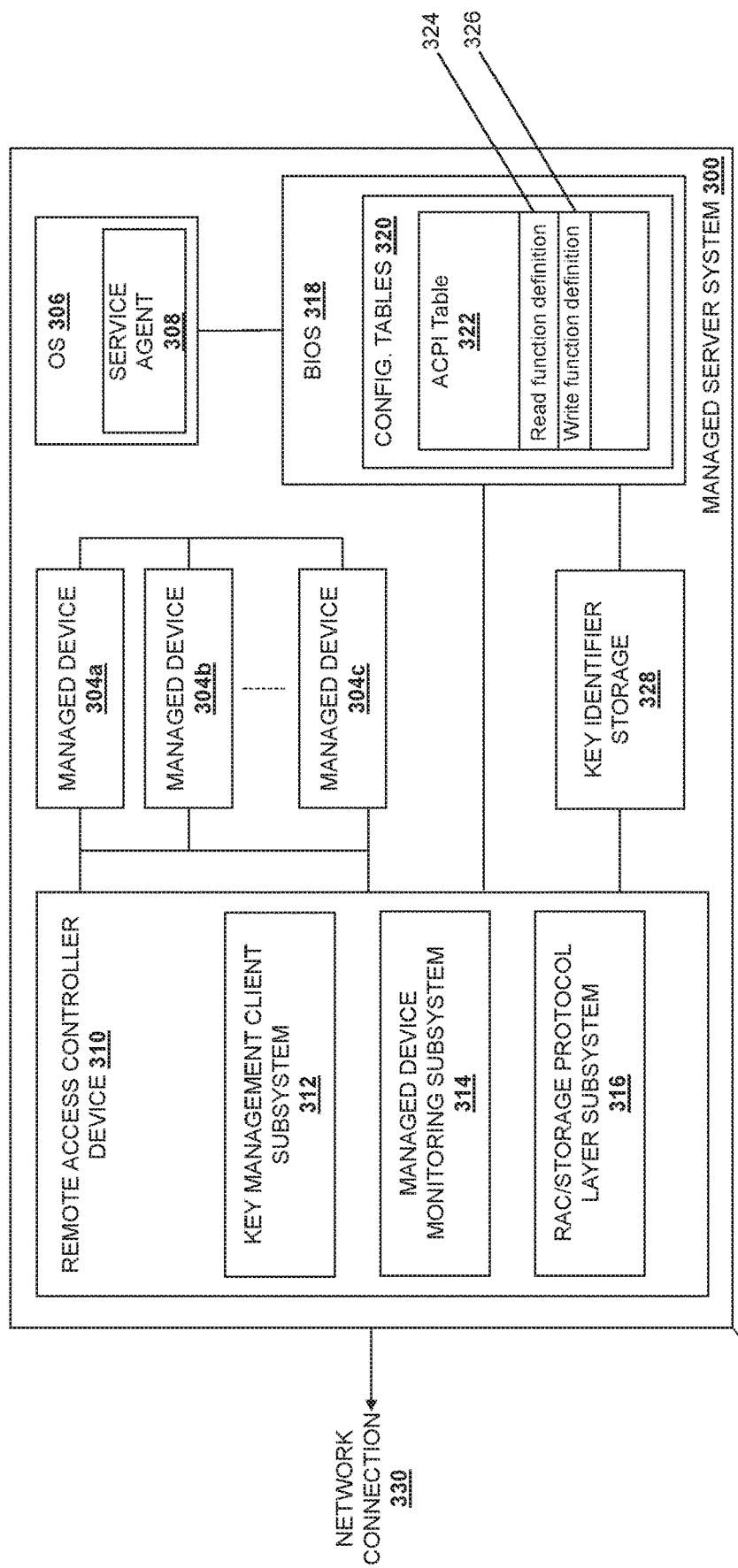
FIG. 3 is a schematic view illustrating a server system used in the key management system of FIG. 2 according to some embodiments.

Referring now to FIG. 3, a managed server system 300 is illustrated according to some embodiments. The managed server system 300 may be any or all of the managed server systems 206a-c discussed above with reference to FIG. 2 and, as such, may be provided by the IHS 100 discussed above with reference to FIG. 1, and/or may include any or all of the components of the IHS 100. According to some embodiments, the managed server system 300 may be provided by a server device, a networking device (e.g., a switch device, a router device, etc.), a desktop computing device, a laptop/notebook computing device, and/or a variety of other computing devices that would be apparent to one of skill in the art in possession of the present disclosure. In some embodiments, a chassis 302 may house the managed server system 300. While, a single managed server system is described herein, one of skill in the art in possession of the present disclosure will recognize that the chassis 302 may house multiple managed server systems substantially similar to the managed server system 300. The managed server system 300 may include a processing system and a memory system that includes instructions that, when executed by the processing system, cause a Basic In/Output System (BIOS) 318 to provide methods to recover locking keys of managed devices 304*a-c* as described herein.

In the illustrated embodiment, a managed server system 300 may include a plurality of managed devices 304*a*, 304*b*, and up to 304*c*. In the examples provided herein, the managed devices 304*a-c* are provided by or implemented with storage devices, such as, for example, bootable storage devices via which the managed server system 300 may be configured to access data in order to boot, start up, reset, or initialize. However, one of skill in the art in possession of the present disclosure will recognize that the managed devices 304*a-c* may be provided by any devices that are configured to be locked and unlocked using the locking keys provided by the key management server system 202. In some embodiments, the managed devices 304*a-c* may be distinguished from each other using identifying information such as key identifiers, such as, for example, universally unique identifiers (UUID)s, and/or other identifying information known in the art that may be used to distinguish one managed device from other managed devices.

In the illustrated embodiment, the managed server system 300 includes an Operation System (OS) 306 that includes the service agent 308. The BIOS 318 is configured to provide specific function definitions to the service agent 308, that causes the service agent 308 to perform functions described herein. In some examples, the service agent 308 may be provided by or implemented with an iDRAC service module (iSM) available from DELL® Inc. of Round Rock, Tex., United States, although other service agents will fall within the scope of the present disclosure as well. The iSM provides a lightweight software service that integrates operating system features with the iDRAC and include functionality such as providing operating system information to the iDRAC, adding capabilities such as lifecycle log event replication into the operating system log, WINDOWS® Management Instrumentation (WMI) support (including storage), iDRAC Simple Network Management Protocol (SNMP) alerts via the operating system, iDRAC hard reset and remote full power cycle capabilities, automated report collection processes, and other functionality, while producing relatively little impact on the processing system (and relatively small footprint in the memory system). As would be understood by one of skill in the art, similar software services in conjunction with a remote access controller may fall into scope of this disclosure. As discussed in further detail herein, the service agent 308 may be functional during an initial boot of the managed server system 300 or may be factory installed in the managed server system 300 by a server system provider.

In the illustrated embodiment, the managed server system 300 may also include a remote access controller device 310 that provides a first managed device locking system to the managed server system 300, particularly via an out-of-band network. In some embodiments, the remote access controller device 310 may be coupled to the managed devices 304*a-c*, the key identifier storage 328, and the BIOS 318. In a specific example, the remote access controller device 310 may be provided by or implemented with the iDRAC that is operably coupled to or embedded within the managed server system 300. The remote access controller device 310 may be remotely accessed by an administrator via an out-of-band network to deploy, monitor, manage, configure, update, troubleshoot and remediate the managed server system 300 from any location, and without the use of agents.

According to some embodiments, the remote access controller device 310 may include a remote access controller processing system and a remote access controller memory system that is coupled to the remote access controller processing system. The remote access controller memory system includes instructions that, when executed by the remote access controller processing system, causes the remote access controller device 310 to perform the functionalities discussed herein, much like other remote access controllers within the scope of this disclosure.

The remote access controller device 310 may include a key management client subsystem 312 that is provided by or implemented with a KMIP client to retrieve the locking keys of the managed devices 304*a-c* from the key management server system 202, so that remote access controller device 310 is able to perform other functionalities of the first managed device locking system discussed herein.

The remote access controller device 310 may also include a managed device monitoring subsystem 314. In some embodiments, the managed device monitoring subsystem 314 may be provided by a boot storage device monitor. The managed device monitoring subsystem 314 may be configured to monitor the managed devices 304*a-c* and/or perform any of the other managed device monitoring system functionalities discussed herein.

The remote access controller device 310 may also include a Remote Access Controller (RAC)/storage protocol layer system 316 that is configured to provide a protocol layer between the remote access controller device 310 and a storage controller of the storage devices, and/or perform any of the other RAC/storage protocol layer subsystem 316 functionality discussed herein.

The remote access controller device 310 may also include a RAC processing system, a RAC memory system, and a RAC engine (not illustrated, but may include components like those discussed above with reference to FIG. 1 and/or components with similar functionalities). The RAC memory system may include instructions that, when executed by the RAC processing system, causes the RAC processing system to provide the RAC engine to perform the functions of the remote access controller device 310 discussed herein. However, while specific systems and functionalities of the remote access controller device 310 have been illustrated and described, one of skill in the art in possession of the present disclosure will recognize that the functionalities described herein may be provided via a variety of different systems and/or subsystem configurations while remaining within the scope of the present disclosure as well.

In the illustrated embodiment, the managed server system 300 may also include the BIOS 318 that provides a second managed device locking system to the managed server system 300, particularly via an in-band network. In some embodiments. the BIOS 318 may be coupled to the managed devices 304*a-c*, the remote access controller device 310, the key identifier storage 328, and the OS 306. As would be understood by one of skill in the art in possession of the present disclosure, the BIOS 318 may be provided by or implemented with non-volatile firmware and may be used to perform hardware initialization during a booting process (e.g., power-on startup) for the managed server system 300. The BIOS 318 may further provide runtime services for the any software application, such as, for example, the service agent 308 running on the OS 306. Furthermore, while discussed as a BIOS herein, one of skill in the art in possession of the present disclosure will recognize that the BIOS 318 may be provided according to the Unified Extensible Firmware Interface (UEFI) specification, which defines a software interface between an operating system and platform firmware in the managed server system 300, and was provided to replace the BIOS firmware interface while providing legacy support for BIOS services. The BIOS 318 may include a BIOS processing system and a BIOS memory system that is coupled to the BIOS processing system and includes instructions that, when executed by the BIOS processing system, causes the BIOS processing system to perform the functionality discussed herein. However, while a specific managed server system 300 has been illustrated and described, one of skill in the art in possession of the present disclosure will recognize that server systems may include a variety of components and/or component configurations while remaining within the scope of the present disclosure as well.

In some embodiments, the BIOS 318 may be configured to perform functions, such as, for example, monitor, access, read, retrieve, and/or write functions with respect to a component or a subsystem within the managed server system 300. For example, the BIOS 318 may monitor availability status of components and subsystems in the managed server system 300 and put the unresponsive components or subsystems to sleep. In a specific example, the BIOS 318 may, routinely or upon request, send communication requests to the remote access controller device 310 and depending upon receiving or not receiving acknowledgment(s) from the remote access controller device 310, may determine the availability status of the remote access controller device 310.

In some embodiments, the BIOS 318 may include the configuration tables 320 that contain data and function definitions that are used to provide recovery and management for the locking keys of the managed devices 304a-c. The configuration tables 320 may include a power management configuration table with specific function definitions to provide efficient power management and handling to the server system 300. For example, the power management configuration table may include an Advanced Configuration and Power Interface (ACPI) table 322. The ACPI table 322 may be loaded at boot or loaded dynamically at run time and may include data and function definitions that are configured to supply configuring data about the boot status, access status, access level and availability of the managed devices 304a-c. The ACPI table 322 may provide function definitions that are used to discover and configure hardware components therein and to control the amount of power provided to each device integrated and/or coupled to the managed server system 300. For example, a function definition in the ACPI table 322 may specify how the BIOS 318, the OS 306, the remote access controller device 310 and/or the other components communicate with each other about power usage.

According to some embodiments, the ACPI table 322 may be configured to include function definitions described herein. The BIOS 318 is configured to expose specific function definitions from the ACPI table 322 to the service agent 308, to enable the service agent 308 to perform the functions described herein. In one example, in response to receiving a request to unlock a managed device, the BIOS 318 may expose the read function definition 324 to the service agent 308 to enable the service agent 308 to retrieve/read key identifiers of locked managed devices from the key identifier storage 328. In another example, in response to detecting a newly installed device, the BIOS 318 may expose the write/store function definition 326 to the service agent 308 to enable the service agent 308 to store/write the key identifier of the newly installed device in the key identifier storage 328. Although a few specific function definitions have been described here but one of skill in the art in possession of the present disclosure will recognize that other types of function definitions may be provided while remaining within the scope of the present disclosure as well.

The managed server system 300 may also include a storage system provided by the key identifier storage 328 that is configured to store key identifiers of the managed devices 304a-c. In some embodiments, the key identifiers of the managed devices 304a-c may be stored, for example, in form of a data structure for managing the encryption and/or authentication of the key identifiers of the managed devices 304a-c. For example, the data structure for storing authentication information may be stored in a plurality of tables comprising a user identifier portion; a user device identifier portion; a physical key identifier portion; and a generic device identifier portion.

According to some embodiments, the key identifier storage 328 may be provided by or implemented with a shared Non-Volatile Random-Access Memory (NVRAM) device such as, for example, a restore Serial Peripheral Interface (rSPI) flash drive or rSPI card. In other examples, the key identifier storage 328 may be provided by or implemented with a dedicated, reserved Non-Volatile Memory express (NVMe) device namespace storage and be managed by NVMe Local Key Management (LKM) self-encryption feature which supports creation, deletion, change, importing, etc. of the key identifier storage 328 configuration features. The key identifier storage 328 may be configured to securely store the key identifiers for use in the manners described herein.

According to some embodiments, the key identifier storage 328 may be an off-motherboard storage device coupled to the motherboard of the managed server system 300. In some embodiments, the key identifier storage 328 may be integrated into the motherboard of the managed server system 300 and coupled to the processing system. For example, the key identifier storage 328 may be a rSPI flash drive or rSPI card that is provided as a circuit board having an SPI connector that can be connected/disconnected to/from the SPI connector and may include a storage space and other modules for providing the functionalities discussed herein. In some embodiments, the external connector may be mounted on the motherboard and be accessible on a surface of the managed server system 300 (e.g., such that it is accessible on a front panel of the chassis 302), while being coupled to the remote access controller device 310 via a coupling (e.g., one or more traces) provided on the motherboard. While a few specific examples have been described, one of skill in the art in possession of the present disclosure will recognize that the key identifier storage 328 may be provided by a variety of storage systems while remaining within the scope of the present disclosure as well.

The managed server system 300 may also include at least one processing system and at least one memory system (not illustrated but may include a processor and a memory like those discussed above with reference to FIG. 1 and/or other components with similar functionalities). The at least one memory system may be coupled to the at least one processing system and include instructions that, when executed by the at least one processing system, cause the at least one processing system to provide at least one managed device locking system that is configured to perform the functionality of the managed device locking systems discussed herein.

In the illustrated embodiment, the managed server subsystem(s) may include processing systems (e.g., central processing units (CPUs), network processing units (NPUs), etc.), memory systems, storage systems, display systems, and/or any other server subsystem that would be apparent to one of skill in the art in possession of the present disclosure. While the discussions herein involve the managed server system 300, one of skill in the art in possession of the present disclosure will recognize that other devices may benefit from the teachings of the present disclosure and thus will fall within its scope. Furthermore, while a specific server system has been described, one of skill in the art in possession of the present disclosure will recognize that server systems may include a variety of components other than those illustrated in order to provide conventional server system functionalities, as well as the functionalities discussed herein, while remaining within the scope of the of the present disclosure.

Figure 4A:
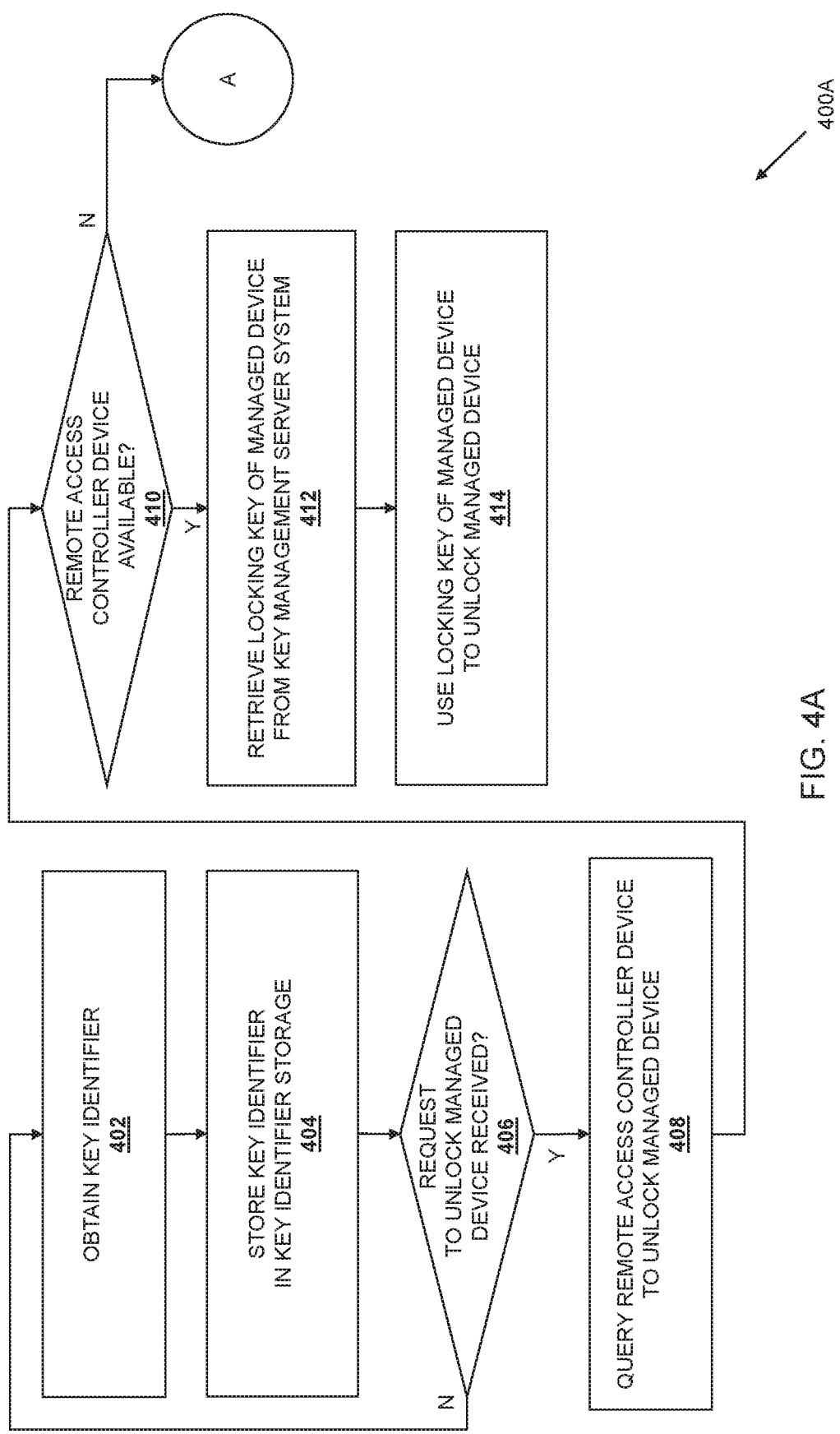
FIGS. 4A and 4B are a flow chart illustrating a method for managing keys and key identifiers according to some embodiments.
Figure 4B:
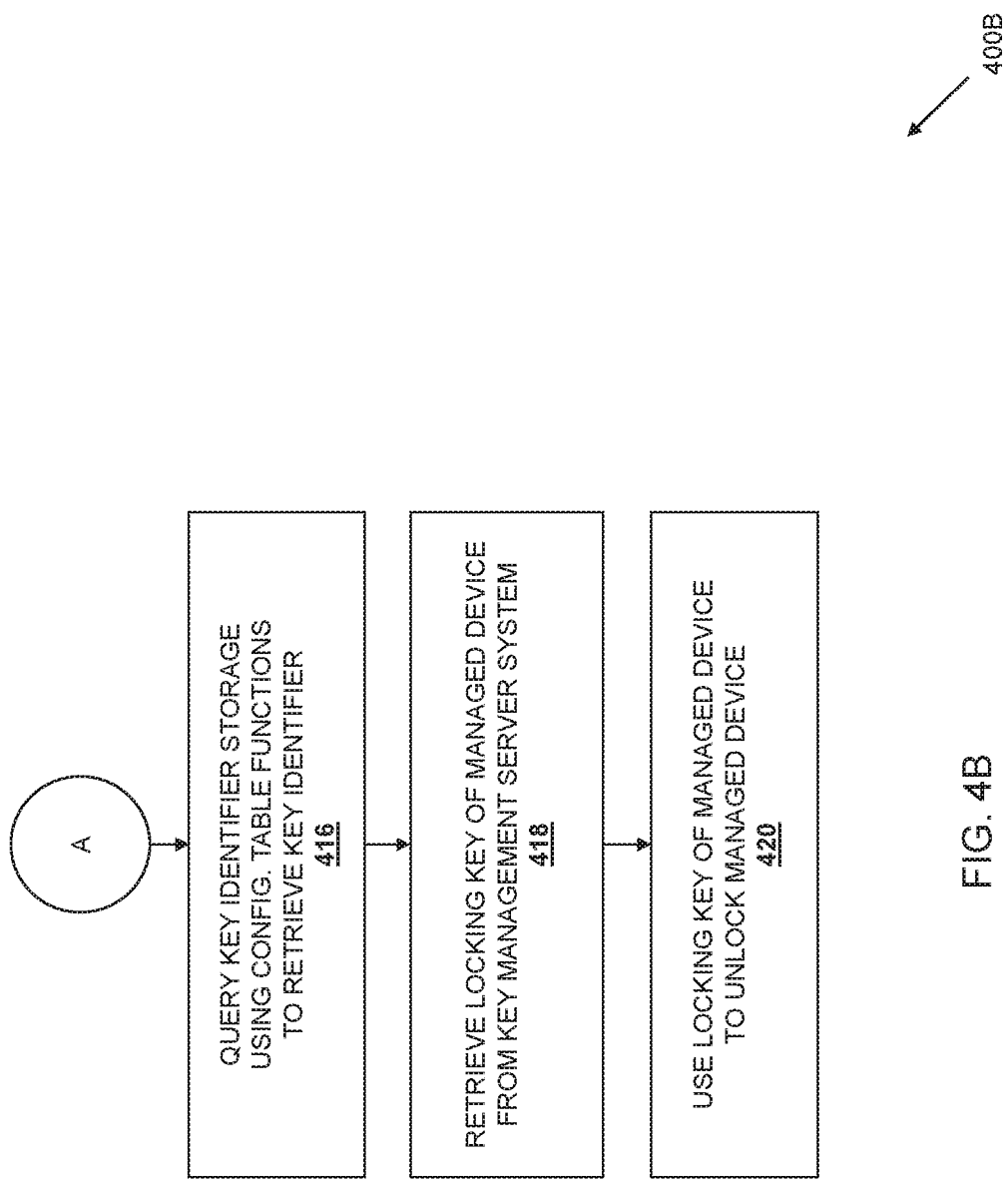

Referring now to FIGS. 4A and 4B, a method 400 of a key management system is illustrated according to some embodiments. As discussed herein, the systems and methods of the present disclosure provide for the recovery and management of locking keys of managed devices in a managed system to ensure unlocking and subsequent access to managed devices, as well as to ensure access to the managed devices when a remote access controller device in the managed system is not available to recover the locking keys of the managed devices. The systems and methods of the present disclosure may further provide management of key identifiers of the managed devices to identify and recover the managed device locking keys from a key management server, independent from the remote access controller device.

In some embodiments, the systems and methods of the present disclosure include a managed server system with one or more managed devices and a remote access controller device. The remote access controller device is configured to store key identifiers of the managed devices in a key identifier storage (e.g. the rSPI flash drive or rSPI card described above). The remote access controller device is also configured to monitor the managed devices to detect any activity or event that may trigger retrieval of the managed devices locking keys, such as, for example, receiving a request to access a locked managed device. Subsequently, in response to receiving the request to unlock a managed device, the remote access controller device uses the key identifier of the locked managed device to identify and retrieve a locking key of the locked managed device from a key management server system via an out-of-band network. Subsequently, the remote access controller device uses the retrieved locking key to unlock the managed device.

In some embodiments where the remote access controller device is unavailable to recover the locking key of the locked managed device, a BIOS in a processing system of the managed server system is configured to enable a service agent (e.g. the iSM agent described above) running on an OS, to access and recover the locking key of the locked managed device from the key management server via an in-band network. For example, in response to receiving a request to unlock a managed device, the BIOS 318 exposes a read/retrieve function definition 324 from the ACPI table 322 to the service agent 308 to retrieve the key identifier of the locked managed device from the key identifier storage 328. Subsequently, the service agent 308 uses the obtained key identifier to identify and retrieve the locking key associated with the managed identifier of the locked managed device from the key management server system 202 via an in-band network and unlock the managed device.

The method 400 begins at block 402 where the key identifiers of the managed devices 304a-c are obtained. In some embodiments, for example, during a managed boot, the first managed device locking system provided by the remote access controller device 310 queries the key management server system 202 to obtain the key identifiers of the managed devices 304a-c.

The method 400 may then proceed to block 404 where the key identifiers of the managed devices are stored in the key identifier storage 328. In some embodiments, for example, during a managed boot, the remote access controller device 310 stores the key identifiers of the managed devices 304a-c, obtained at the block 402, in the key identifier storage 328.

In some embodiments, at or before block 404, the managed device monitoring subsystem 314 monitors the managed devices 304a-c to detect an event or activity that triggers the retrieval of a locking key of a managed device from the managed devices 304a-c306b, and/or 306c. For example, one event that may trigger retrieving a locking key of a managed device, is detecting a request from a user to unlock a managed device. In other examples, a managed device may need to be unlocked after activities such as, booting, startup, resetting, or initialization of the managed server system 300.

The method 400 may then proceed to decision block 406 where it is determined whether a request to unlock a managed device has been received. In some embodiments, in response to monitoring the managed devices 304a-c, the remote access controller device 310 determines whether a request to unlock a managed device has been received.

If, at decision block 406, it is determined that no request to unlock a managed device has been received, the method 400 returns to the block 402 and proceeds substantially as discussed above. As such, the managed device monitoring subsystem 314 will continue to monitor the managed devices 304a-c to detect any changes in their activities that would trigger unlocking of a managed device.

If, at decision block 406, it is determined that a request to unlock a managed device has been received, the method 400 may then proceed to block 408 where the remote access controller device 310 is queried to unlock the managed device. In some embodiments, a processing system in the managed server system 300, for example the BIOS 318, queries the remote access controller device 310 to unlock the managed device.

The method 400 may then proceed to decision block 410 where it is determined whether the remote access controller device 310 is operational/available. In some embodiments, a processing system in the managed server system 300, for example the BIOS 318, determines that whether the remote access controller device 310 is operational/available, for example by sending communication requests to the remote access controller device 310 and expecting an acknowledgment in a limited time cycles. For example, the remote access controller device 310 may become non-operational/unavailable, if remote access controller device 310 caches a faulty firmware or if an application running on the OS 306 is consuming a lot of system memory, causing the remote access controller device 310 to fail. As such, the BIOS 318 determines that the remote access controller device 310 is non-operational/unavailable, if the BIOS 318 does not receive an acknowledgement from the remote access controller device 310 in a limited time cycles.

If, at decision block 410, it is determined that the remote access controller device 310 is operational/available, the method 400 may then proceed to block 412 where the remote access controller device 310 operates to retrieve the requested locking key associated with the locked managed device. In some embodiments, the key management client subsystem 312 uses the key identifier of the locked managed device stored in the key identifier storage 328 to identify the requested locking key in the key management server system 202. Subsequently, the key management client subsystem 312 retrieves the identified locking key via an out-of-band communication link provide by the network connection 330 through the network 204.

The method 400 may then proceed to block 414, where the locked managed device is unlocked using the retrieved locking key at the block 412. In some embodiments, the RAC/storage protocol layer subsystem 316 uses the retrieved locking key to unlock the locked managed device to be accessed.

If, at decision block 410, it is determined that the remote access controller device 310 is not operational/available, the second managed device locking system provided by the BIOS 318 operates to recover the locking key of the locked managed device from the key management server system 202, via an in-band network. As such, the method 400 may then proceed to block 416 where the key identifier storage 328 is queried to provide a key identifier associated with the locked managed device. In some embodiments, the BIOS 318 exposes the service agent 308 to the read/retrieve function definition 324 from the ACPI table 322 to enable the service agent 308 to read/retrieve the key identifier of the locked managed device from the key identifier storage 328.

The method 400 may then proceed to block 418, where the locking key of the locked managed device is retrieved from the key management server system 202. In some embodiments, the service agent 308 uses the key identifier of the locked managed device to identify the locking key of the locked managed device in the key management server system 202 and retrieve the requested locking key, via an in-band communication link provided by the network connection 330 through the network 204.

The method 400 may then proceed to block 420, where the retrieved locking key in the block 418 is used to unlock the locked managed device. In some embodiments, the service agent 308 is configured to unlock the locked managed device using the retrieved locking key.

In some embodiments where external storage devices are installed in the managed server system 300, a method to provide management for keys and key identifiers of the newly installed devices is provided herein.

Figure 5:
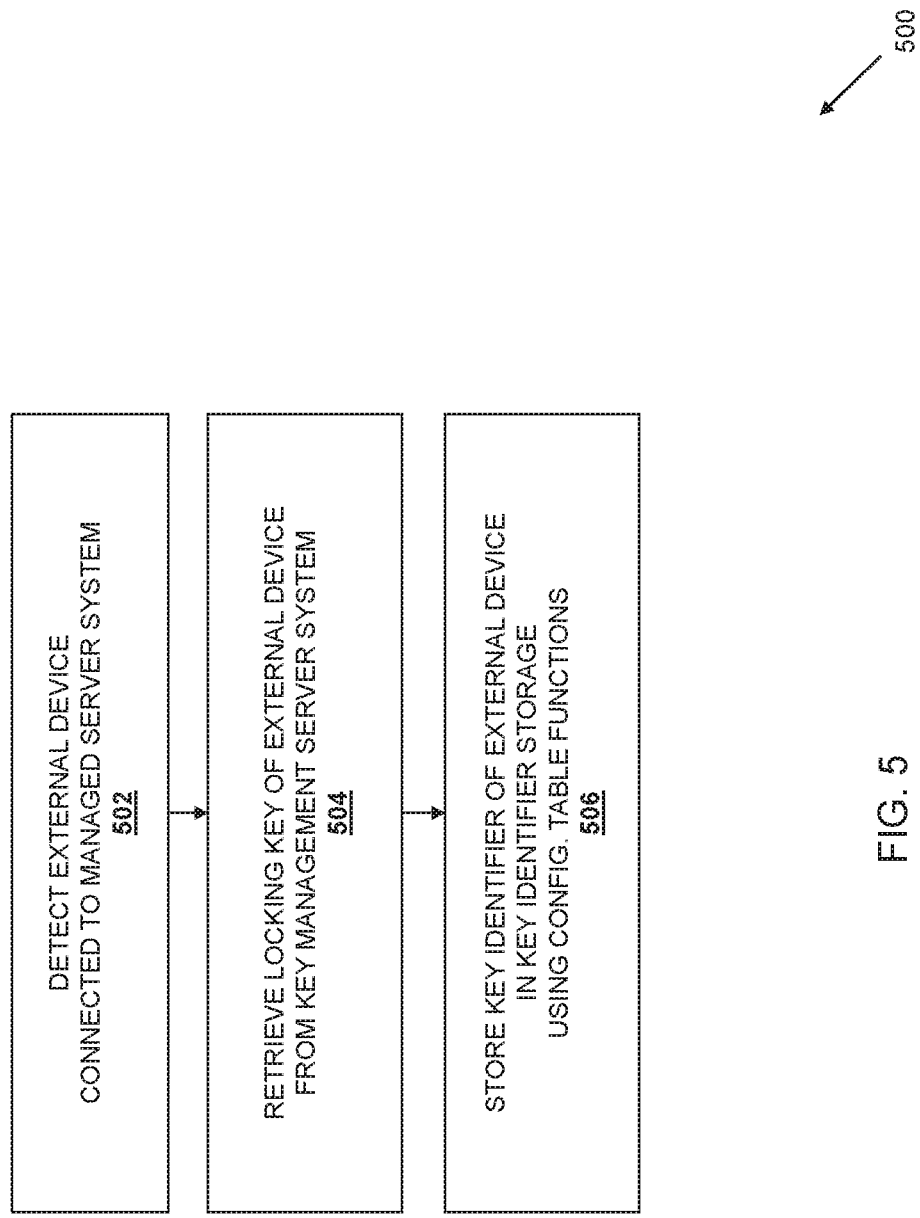
FIG. 5 is a flow chart illustrating a method for managing keys and key identifiers for newly installed managed storage devices according to some embodiments.

Referring now to FIG. 5, an embodiment of the method 500 to provide management for keys and key identifiers of newly installed devices in a managed server system is illustrated when a remote access controller device is unavailable. In some embodiments where the remote access controller device 310 is unavailable, the BIOS 318 is configured to provide recovery and management for keys and key identifiers of the newly installed managed devices.

The method 500 begins at block 502 where a newly installed device is detected on the managed server system 300. In some embodiments, the BIOS 318 is configured to detect and authenticate the newly installed managed device in the managed server system 300.

The method 500 may then proceed to block 504 where a locking key of the newly installed managed device is retrieved from the key management server system 202. In some embodiments, the service agent 308 may operate to retrieve the locking key associated with the newly installed managed device from the key management server system 202 via an in-band communication link provided by network connection 330 over the network 204.

The method 500 then proceeds to a block 506 where the key identifier of the newly installed managed device is stored in the key identifier storage 328. In some embodiments, the BIOS 318 exposes the write/store function definition 326 from the ACPI table 322 to the service agent 308 to enable the service agent 308 to write/store the key identifier associated with the newly installed managed device in the key identifier storage 328. As such, subsequently, in response to detecting an event or activity that may trigger unlocking the newly installed managed device, such as, for example, receiving a request to unlock the newly installed managed device, the service agent 308 may follow the steps in the method 400 described above.

Thus, systems and methods have been described that provide a key recovery management to provide access to managed device locking keys to ensure access to managed devices in a managed server system as well as to ensure access to the managed devices when a remote access controller is unavailable.

In some embodiments, a first managed device locking system, provided by a remote access controller, stores key identifiers of the managed devices in a key identifier storage and monitors the managed devices to detect any change in their status or activities that may trigger retrieval of their locking keys. In response to detecting an event that triggers retrieving a locking key of a managed device, the remote access controller uses the key identifier of the locked managed device to identify and retrieve the locking key associated with the locked managed device from a key management server. Subsequently, the remote access controller device uses the locking key to unlock the managed device to be accessed.

In some embodiments where the remote access controller is not available to provide the locking key of the locked managed device, a second managed device locking system, provided by a BIOS, is configured to provide a method to recover the locking key of the locked managed device from the key management server. In some embodiments, the BIOS includes a configuration table that contains a plurality of definition functions that when are provided to and executed by a service agent in an OS of the managed server system, the service agent is configured to access and retrieve the locking key of the locked managed device from the key management server. For example, in response to receiving a request to unlock a managed device, the BIOS exposes a retrieve/read function definition to the service agent to enable the service agent to retrieve/read a key identifier associated with the locked managed device from the key identifier storage. Subsequently, the service agent may identify and recover a locking key associated with the key identifier of the locked managed device from the key management server and use it to unlock the locked managed device. In another example where the remote access controller is unavailable, and a newly installed managed device is detected and authenticated on the managed server system, the service agent is configured to retrieve a locking key of the newly installed managed device from the key management server system, via an in-band network. Subsequently, the BIOS exposes a write/store function definition to the service agent to enable the service agent to write/store a key identifier associated with the newly installed managed device in the key identifier storage.

The systems and methods of the present disclosure provide for the management of device locking keys and key identifiers to ensure access to managed devices particularly when a remote access controller is unavailable.

Although illustrative embodiments have been shown and described, a wide range of modification, change and substitution is contemplated in the foregoing disclosure and in some instances, some features of the embodiments may be employed without a corresponding use of other features.

Accordingly, it is appropriate that the appended claims be construed broadly and in a manner consistent with the scope of the embodiments disclosed herein.

What is claimed is:

1. A system, comprising:
a key management system that stores a plurality of locking keys; and
a managed system that is coupled to the key management system through a network, comprising:
   a managed device;
   a key identifier storage;
   a first managed device locking system that is coupled to the managed device and the key identifier storage and that is configured to:
      store a key identifier in the key identifier storage, wherein the key identifier identifies a locking key that is included in the plurality of locking keys and that is associated with the managed device; and
      provide, based upon the key identifier, access to the locking key, that is stored in the key management system when an event that triggers unlocking the managed device has occurred; and
   a second managed device locking system that is coupled to the managed device, the key identifier storage, and the first managed device locking system and that is configured to:
      determine that an event that triggers unlocking the managed device has occurred;
      determine that the first managed device locking system is unavailable;
      obtain, based upon the key identifier and in response to the first managed device locking system being unavailable, the locking key for the managed device from the key management system; and
      unlock the managed device using the locking key.

2. The system of claim 1, wherein the first managed device locking system becomes unavailable when the first managed device locking system is non-operational or unresponsive.

3. The system of claim 1, wherein the first managed device locking system comprises a remote access controller device and the second managed device locking system comprises a Basic Input/Output System (BIOS).

4. The system of claim 3, wherein the BIOS provides access to the locking key for the managed device in the key management system via an in-band network.

5. The system of claim 3, wherein the BIOS includes a configuration table that comprises a read function definition that, when exposed to an application operating on an operating system, causes the application to:
read the key identifier of managed device in the key identifier storage;
identify the locking key of the managed device based upon the key identifier of the managed device in the key management system;
retrieve the locking key of the managed device from the key management system; and
unlock the managed device using the locking key of the managed device.

6. The system of claim 5, wherein the configuration table comprises a write function definition that, when exposed to the application, causes the application to:
write a key identifier of a newly installed managed device in the key identifier storage.

7. The system of claim 5, wherein the configuration table comprises an Advanced Configuration and Power Interface (ACPI) table.

8. An Information Handling System (IHS), comprising:
a managed device;
a key identifier storage;
a first processing system that is coupled to the managed device and the key identifier storage;
a first memory system that is coupled to the first processing system that includes instructions that, when executed by the first processing system, causes the first processing system to provide a first managed device locking system that is configured to:
   store a key identifier in the key identifier storage, wherein the key identifier identifies a locking key that is stored in a key management system and that is associated with the managed device; and
   provide, based upon the key identifier, access to the locking key that is stored in a key management system when an event that triggers unlocking the managed device has occurred; and
a second memory system that is coupled to the managed device, the key identifier storage, and a second processing system that includes instructions that, when executed by the second processing system, causes the second processing system to provide a second managed device locking system that is configured to:
   determine that an event that triggers unlocking the managed device has occurred;
   determine that the first managed device locking system is unavailable;
   obtain, based upon the key identifier and in response to the first managed device system being unavailable, the locking key for the managed device from the key management system; and
   unlock the managed device using the locking key.

9. The IHS of claim 8, wherein the first managed device locking system becomes unavailable when the first managed device locking system is non-operational or unresponsive.

10. The IHS of claim 8, wherein the first managed device locking system comprises a remote access controller device and the second managed device locking system comprises a Basic Input/Output System (BIOS).

11. The IHS of claim 10, wherein the BIOS provides access to the locking key for the managed device in the key management system via an in-band network.

12. The IHS of claim 10, wherein the BIOS includes a configuration table that comprises a read function definition that, when exposed to an application operating on an operating system, causes the application to:
read the key identifier of managed device in the key identifier storage;
identify the locking key of the managed device based upon the key identifier of the managed device in the key management system;
retrieve the locking key of the managed device from the key management system; and
unlock the managed device using the locking key of the managed device.

13. The IHS of claim 12, wherein the configuration table comprises a write function definition that, when exposed to the application, causes the application to:
write a key identifier of a newly installed managed device in the key identifier storage.

14. The IHS of claim 12, wherein the configuration table comprises an Advanced Configuration and Power Interface (ACPI) table.

15. A method for managing keys, comprising:
storing, by a first managed device locking system in a key identifier storage, a key identifier that identifies a locking key that is stored in a key management system that is coupled to the first managed device locking system via a network, wherein the locking key is associated with the managed device;

determining, by the first managed device locking system, that an event that triggers unlocking the managed device has occurred;

obtaining, by the first managed device locking system using the key identifier, the locking key for the managed device from the management system;

determining, by a second managed device locking system, that an event that triggers unlocking the managed device has occurred;

determining, by the second managed device locking system, that the first managed device locking system is unavailable;

obtaining, by the second managed device locking system using the key identifier and in response to the first managed device system being unavailable, the locking key for the managed device stored in the key management system; and causing, by the second managed device locking system using the locking key, the managed device to unlock.

16. The method in claim 15, further comprising:

reading the key identifier of managed device in the key identifier storage; in response to detecting an activity that triggers retrieval of a locking key of the managed device, by the second managed device locking system exposing a read function definition from a configuration table to an application operating on an operating system;

identifying the locking key for the managed device based on the key identifier of the managed device in the key management system;

retrieving the locking key of the managed device from the key management system; and unlocking the managed device using the locking key of the managed device.

17. The method in claim 16, further comprising:

writing a key identifier of a newly installed managed device in the key identifier storage, in response to detecting a newly installed managed device, by the second managed device locking system exposing a write function definition from the configuration table to the application.

18. The method in claim 15, wherein the first managed device locking system becomes unavailable when the first managed device locking system is non-operational or unresponsive.

19. The method in claim 15, wherein the first managed device locking system comprises a remote access controller device and the second managed device locking system comprises a Basic Input/Output System (BIOS).

20. The method in claim 16, wherein the configuration table comprises an Advanced Configuration and Power Interface (ACPI) table.

* * * * *